(12) United States Patent
Johnsen (10) Patent No.: US 10,590,943 B2
(45) Date of Patent: *Mar. 17, 2020

(54) TURBOCOMPRESSOR ANTISURGE CONTROL BY VIBRATION MONITORING

(71) Applicant: Compressor Controls Corporation, Des Moines, IA (US)

(72) Inventor: James R. Johnsen, Johnston, IA (US)

(73) Assignee: Compressor Controls Corporation, Des Moines, IA (US)

( * ) Notice: Subject to any disclaimer, the term of this patent is extended or adjusted under 35 U.S.C. 154(b) by 305 days.

This patent is subject to a terminal disclaimer.

(21) Appl. No.: 15/488,782

(22) Filed: Apr. 17, 2017

(65) Prior Publication Data

US 2017/0218968 A1  Aug. 3, 2017

Related U.S. Application Data

(63) Continuation of application No. 13/473,237, filed on May 16, 2012, now Pat. No. 9,624,936.

(51) Int. Cl.
*F04D 27/02* (2006.01)
*G01H 1/00* (2006.01)
*F04D 27/00* (2006.01)
*F02D 41/00* (2006.01)

(52) U.S. Cl.
CPC ....... *F04D 27/0223* (2013.01); *F04D 27/001* (2013.01); *F02D 41/0007* (2013.01); *F04D 27/00* (2013.01); *F04D 27/02* (2013.01); *G01H 1/003* (2013.01)

(58) Field of Classification Search
None
See application file for complete search history.

(56) References Cited

U.S. PATENT DOCUMENTS

| | | | |
|---|---|---|---|
| 6,536,284 B2* | 3/2003 | Bonanni | F04D 27/001 702/56 |
| 8,152,496 B2* | 4/2012 | White | F04D 27/0215 417/282 |
| 2010/0296914 A1* | 11/2010 | Staroselsky | F04D 27/001 415/47 |
| 2013/0166082 A1* | 6/2013 | Ambekar | G05B 13/04 700/287 |

* cited by examiner

*Primary Examiner* — Igor Kershteyn
*Assistant Examiner* — Jason G Davis
(74) *Attorney, Agent, or Firm* — Snyder, Clark, Lesch & Chung, LLP (57) ABSTRACT

The proposed mechanical method of turbocompressor surge detection uses vibration signals from vibration monitoring equipment mounted on the compressor components to detect a surge event and provide antisurge control thereby. This method utilizes only mechanical information to identify surge, as compared to present day antisurge controllers that use compressor thermodynamic information such as flow, pressure, and temperature to locate a compressor's operating point on a compressor map compared to a surge region.

20 Claims, 6 Drawing Sheets

TURBOCOMPRESSOR ANTISURGE CONTROL BY VIBRATION MONITORING

RELATED APPLICATION

The present application is a continuation of U.S. application Ser. No. 13/473,237 filed May 16, 2012, the contents of which is hereby incorporated herein by reference in its entirety.

BACKGROUND OF THE INVENTION

Field of the Invention

The present invention relates generally to an automatic control scheme. More particularly the present invention relates to a method and apparatus for protecting a turbocompressor from surge by monitoring crucial vibration information and acting thereon.

Background Art

Compressor surge and stall represent unstable operating regimes of axial and centrifugal turbocompressors. Either mode of instability may lead to compressor damage. First, rotor vibration due to the unsteady flow of stall can cause flutter and associated fatigue. The flow reversal of surge results in an increase in temperature within the compressor. At the same time, the reversed flow and pressure variations between the intake and discharge ends of the compressor cause rapid changes in axial thrust, thereby risking damage to the thrust bearing and causing blades or vanes to rub on the compressor housing. Furthermore, abrupt speed changes may occur, possibly resulting in overspeed or underspeed of the compressor rotor The aerodynamics of rotating stall and surge have been investigated extensively. This research has led to common industry definitions of local stall, stage stall, stall zone, surge and rotating stall. Local stall is a flow separation or reversal in either an impeller or diffuser in a limited angular range. Stage stall is when a local stall increases to the point where one in a series of centrifugal impellers (and associated inlet and discharge stationary components) experiences reversed flow in part of its cross-sectional flow area. In any stalled condition, the overall flow is still in a forward, pressurizing direction. A stall zone is any cross-sectional area of an impeller or diffuser undergoing a flow perturbation and which manifests symptoms of a stall in a compressor. Surge is defined as the periodic oscillations of the bulk compressor flow and its associated periodic pressure swings. If these oscillations include flow reversals, deep surge is said to have occurred. Rotating stall comprises stall zones covering several blades and passages. The stall zones propagate circumferentially at a fraction of rotor speed. The number of stall zones and the propagating rates vary between compressors.

Figure 1:
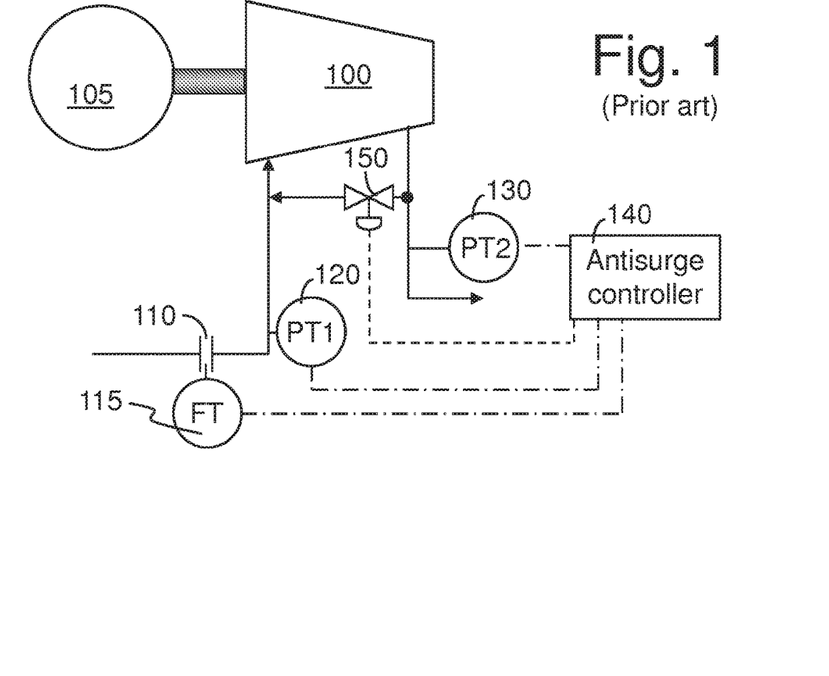
FIG. 1 is a schematic of a compressor and antisurge control system of the prior art.

A compressor and traditional antisurge control system are shown in FIG. 1. Turbocompressor antisurge control methods of the prior art make use of thermodynamic information taken at the inlet and outlet of the compressor 100 driven by a driver 105. This information typically comprises at least a pressure differential signal gleaned from an obstruction flow meter 110 and transmitted by a flow transmitter 115, suction pressure, transmitted by a suction pressure transmitter 120, and discharge pressure, transmitted by a discharge pressure transmitter 130. These signals are fed into an antisurge controller 140 where the signals are analyzed and a closed loop response is calculated. This closed loop response determines the set point of an antisurge valve 150. Signals representing other thermodynamic data, such as one or more temperatures, may also be used by the antisurge controller. Mechanical parameters such as compressor rotational speed, inlet guide vane position, or discharge guide vane position may also be measured and transmitted to the antisurge control system.

Figure 2:
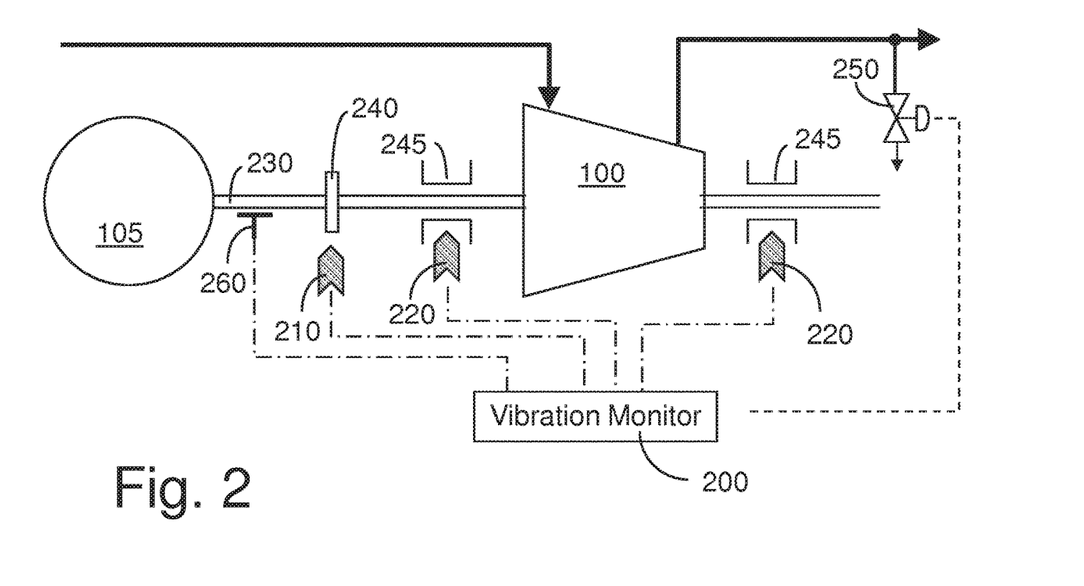
FIG. 2 is a schematic of a compressor and vibration monitoring system.

Typical compressor drivers 105 comprise steam or gas turbines and electric motors. The antisurge valve 150 may be a recycle valve such as that shown in FIG. 1, or a blowoff valve 250, as illustrated in FIG. 2 and as might be used for air, nitrogen, and sometimes $CO_2$ compressors. Surge is avoided or recovered from by increasing the flow rate through the compressor via opening the antisurge valve.

Traditionally independent of the antisurge control system, vibration data are taken at radial bearing locations, at the thrust bearing, and at other locations on the compressor to monitor movement and vibration of the compressor rotor or impeller shaft. During operation, the compressor shaft is held against a thrust bearing with slight movement depending on operating rotational speed and other conditions.

Compressor surge is described in several textbooks and many articles. One such textbook is *Aircraft Propulsion* by Saeed Farokhi (ISBN 978-0-470-03906), published by John Wiley and Sons, is hereby incorporated in its entirety by reference. Simply speaking, surge can be defined as a point where the compressor can no longer maintain an adequate pressure difference to continue forward flow, and a bulk flow reversal occurs. Detecting the rapid reversal in flow when using an obstruction flow meter is fairly straightforward. Some compressors, however, are not fitted with a flow meter of any kind. Further, sensors and transmitters can fail so other methods to detect surge and to provide antisurge control would be of value.

There is, therefore, a need for a method and apparatus to detect surge and protect a compressor therefrom using signals other than those of thermodynamic nature.

BRIEF SUMMARY OF THE INVENTION

An object of the present invention is to provide a method and apparatus for effectively detecting turbocompressor surge using mechanical signals such as displacement and vibration. Another object of this invention is to provide antisurge control based on information gleaned from these mechanical signals.

As explained above, compressor surge is the bulk reversal of the flow direction in the compressor. That is, effectively across the full span and effectively around the entire annulus of the compressor, the fluid flow direction reverses, or at least drops to a very low level, because the compressor cannot maintain an adequate differential pressure from inlet to outlet. Because the differential pressure across the compressor rotor drops, and because of the reversed flow direction, the compressor's rotor shaft is free to move off its thrust bearing. Significant axial displacement and vibration results.

The present method monitors the axial position of the rotor shaft and detects the event when the rotor shaft is displaced from the thrust bearing, indicating surge. The axial vibration amplitude, measured in a specific frequency band, increases during surge.

When surge is detected using this method, a control system can take corrective action to extract the compressor from its surge condition.

The use of vibration data to detect surge provides an independent method to the flow path (thermodynamic) method used in the common, present day, antisurge control system. Thermodynamic transmitter failures or compressor map configuration errors do not affect the ability to detect surge based on vibration data.

The proposed system uses narrow-band frequency analysis on the vibration data, Vibration monitoring and Fourier transforms are outlined in many undergraduate textbooks. Two such textbooks are *Fundamentals of Mechanical Vibrations* by S. G. Kelly (2000) (ISBN 0-70-230092-2), published by McGraw-Hill, and *Elements of Vibration Analysis* by L. Merovitch (1975) (ISBN 0-70-041340-1), published by McGraw-Hill. Both of these texts are hereby incorporated in their entirety by reference.

The technique of the present invention allows the system to monitor specific frequency bands that tend to only respond to surge. These bands can be set for each controller based on the ambient noise floor and result in significantly higher signal-to-noise ratio when surge occurs.

Surge detection is based on a ratio of the current vibration to background vibration in each band. The background is continuously monitored and a mean value is calculated over a set time period. A set-point is calculated based on a ratio of the current value and the background value, helping to improve the signal to noise ratio. The magnitude of this set-point is determined based on the type compressor and operating conditions and may be customized for each compressor. When the set-point has been exceeded, surge is imminent or has occurred. This is true for both the axial and radial vibration.

In addition to vibration, the position of the rotor is also monitored. Axial position indicates movement of the rotor from the thrust bearing. During operation, the differential pressure across the rotor causes a small axial displacement of the rotor. When this displacement exceeds an allowable limit, surge has occurred.

Typically eddy current proximity probes are used to measure the vibration and position of the compressor rotor. Sensors other than axial and radial proximity may also be used instead of or in addition to proximity sensors to detect surge if they are mounted in a suitable location and the background noise is sufficiently low.

The novel features believed to be characteristic of this invention, both as to its organization and method of operation together with further objectives and advantages thereto, will be better understood from the following description considered in connection with the accompanying drawings hi which a presently preferred embodiment of the invention is illustrated by way of example. It is to be expressly understood however, that the drawings and examples are for the purpose of illustration and description only, and not intended in any way as a definition of the limits of the invention.

DETAILED DESCRIPTION OF THE INVENTION

The compressor 100 is equipped with a vibration monitoring system, including a vibration monitor 200 and one or more vibration sensors 210, 220, such as an axial displacement, velocity, or acceleration sensor 210, and radial displacement, velocity, or acceleration sensors 220. The vibration monitor 200 provides signal conditioning for the purpose of more accurately detecting surge. Additionally, the vibration monitor provides a signal that may be conveyed to an antisurge controller 140, or directly as a set point to the antisurge valve 150, 250 to avoid, prevent, or recover from a compressor surge. Thus, the vibration monitor 200 may be part of a monitoring system that generates a compressor stability indication based on the mechanical measurements described above. The sensors 210, 220 may include sensors 210, 220 operatively attached to the bearings of compressor rotor shaft 230. A thrust bearing 240 as well as a plurality of radial bearings 245, are illustrated along the compressor rotor or impeller shaft 230 in FIG. 2. The thrust bearing 240 is intended to provide a variable axial force to counter a resultant force due to the pressure forces and the axial component of the substantial derivative of the momentum of the fluid through the compressor. The radial bearings 245 are intended to provide for relatively friction-free rotation of the compressor shaft 230 and to restrict radial displacement of the shaft 230 by presenting a radial-directed force countering any radial component of force presented by the rotor shaft 230.

The axial vibration sensor 210 senses axial displacement, velocity, or acceleration of the compressor shaft 230 at the thrust bearing 240. A signal representing this measurement is transmitted to the vibration monitor 200. Similarly, the radial beatings 245 are shown with radial sensors 220 operatively attached thereto. The radial displacement sensors 220 for the radial bearings 245 transmit radial shaft displacement, velocity, or acceleration signals to the vibration monitor 200. Generally, a rotational speed sensor 260 is provided to sense the compressor shaft's angular speed. The signal from the speed sensor 260 is transmitted to the vibration monitor 200. This signal may be unnecessary, especially for a constant speed driver, such as many electric motors.

Figure 3:
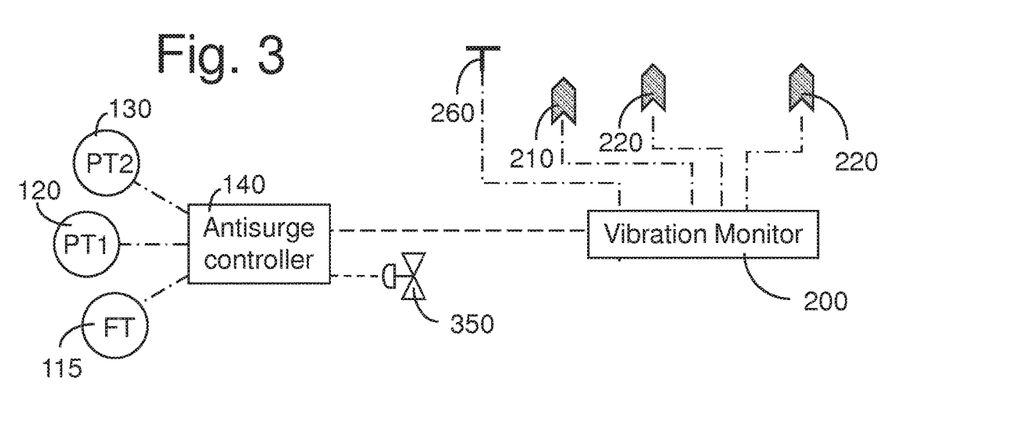
FIG. 3 is a schematic of the antisurge control system and the vibration monitoring system.

Ultimately, an antisurge valve 350 must be actuated under surge conditions to increase the flow rate through the turbocompressor. The antisurge valve 350 may be a recycle valve 150 or a blowoff valve 250. On rare occasion, a compressor's purpose is to provide a vacuum, in which case the antisurge valve is disposed on the suction side of the air compressor, and is actuated the same as the blowoff valve 250. The vibration monitor 200 may provide the antisurge valve position set point directly, as indicated in FIG. 2. Alternatively, the vibration monitor 200 may provide information to the antisurge controller 140 and the antisurge controller then provides the antisurge valve position set point as shown in FIG. 3.

Figure 4A:
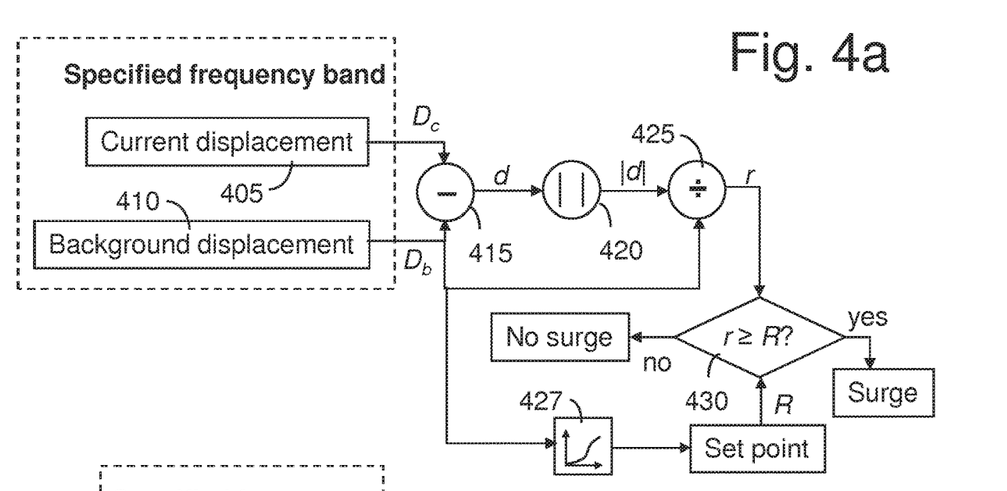
FIG. 4a is a logic diagram of a scheme for detecting surge using displacement data.
Figure 4B:
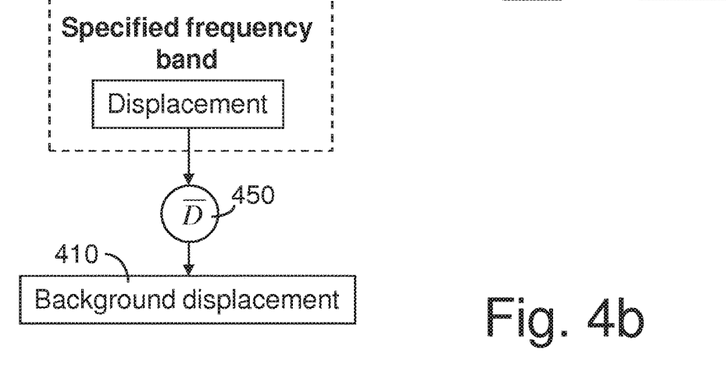
FIG. 4b is a logic diagram illustrating the calculation of background displacement.

FIG. 4a illustrates a logic chart where the current displacement 405 and background displacement 410 are both calculated using only frequencies within the same predetermined frequency band, as indicated. The predetermined frequency band may be a function of the compressor's rotational speed. This simple logic chart is used to determine if the compressor 100 is in surge or not. As illustrated in FIG. 4b, the background displacement, $D_b$ 410, is calculated by continuously monitoring the shaft displacement in the predetermined frequency band during a predetermined duration of time, $\Delta t$, while the compressor 100 is not in surge and a mean value, $D_b$ 410, is calculated as follows in an averaging operation, $\overline{D}$ 450:

$$D_b = \frac{1}{\Delta t}\int_{t_0}^{t_0+\Delta t} D\,dt$$

where D is a current displacement level, calculated as a suitable vector norm such as a Root Mean Squared (RMS) value of displacement. The background displacement, $D_b$ 410, may be recalculated at different operating conditions any time the compressor is not in surge.

The difference between the current displacement level, $D_c$ 405, and the background displacement level, $D_b$ 410, is determined in a difference operation 415. In other words, $d=D_c-D_b$. The absolute value of d is found in the absolute value operation 420, or $|d|=|D_c-D_b|$. The background displacement level, $D_b$ 410, is divided into the absolute value of d, as:

$$r = \frac{|D_c - D_b|}{D_b},$$

in the division operation 425. A set point, R, may be a function 427 of the background displacement level, $D_b$ 410, such as $(1+n)D_b$, where n is a number greater than zero. For instance, if n=0.1. When the absolute value of d exceeds the background displacement level, $D_b$ 410, by 10%, then r=R.

As long as r<R, the comparator function 430 returns a false, thus concluding the compressor 100 is not in surge. When r≥R, the comparator function 430 returns a true, thus concluding the compressor 100 is in surge.

Figure 4C:
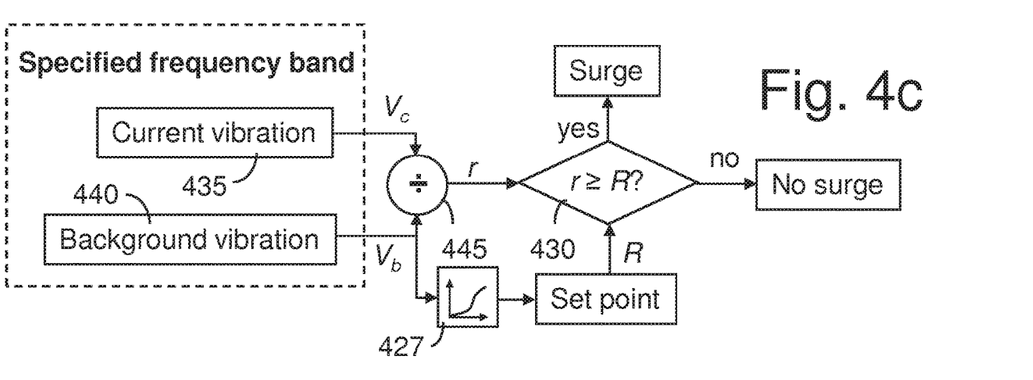
FIG. 4c is a logic diagram of a scheme for detecting surge using vibration data.
Figure 4D:
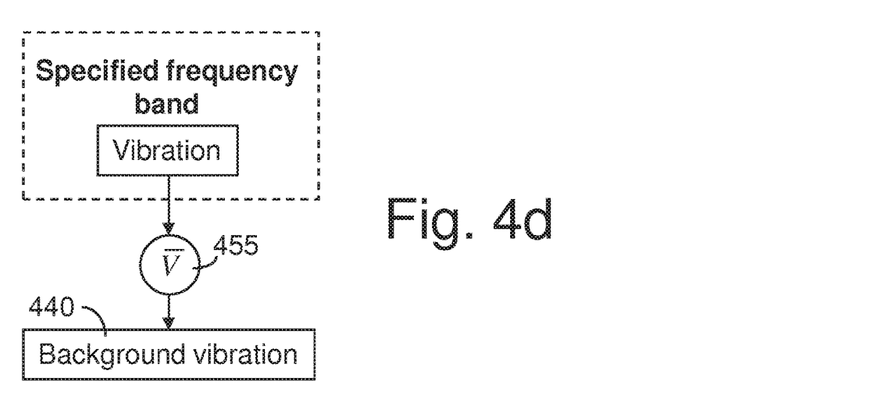
FIG. 4d is a logic diagram illustrating the calculation of background vibration.

FIG. 4c illustrates a logic chart where vibration—velocity or acceleration—is used to detect surge. The current vibration 435 and background vibration 440 are both restricted within the same predetermined frequency band, as indicated. The predetermined frequency band may be a function of the compressor rotational speed. As illustrated in FIG. 4d, the background vibration, $V_b$ 440, which may be velocity or acceleration, is calculated by continuously monitoring the shaft vibration in the predetermined frequency band during a predetermined duration of time, $\Delta t$, while the compressor 100 is not in surge and a mean value, $V_b$ 440, is calculated as follows in an averaging operation, $\overline{V}$ 455:

$$V_b = \frac{1}{\Delta t}\int_{t_0}^{t_0+\Delta t} V\,dt$$

where V is a current vibration level, calculated as a suitable vector norm such as an RMS value of velocity or acceleration. Those of ordinary skill in the art are well aware of the calculation of an RMS value:

$$V = \sqrt{\frac{1}{N}\sum_i^N V_i^2}$$

The background vibration, $V_b$ 440, may be recalculated at different operating conditions any time the compressor is not in surge.

The ratio of the current vibration level, $V_c$, 435, to the background vibration level, $V_b$ 440, is determined in a division operation 445. In other words, $$r = \frac{V_c}{V_b}.$$

A set point, R, may be a function 427 of the background vibration level, $V_b$ 440, such as $(1+n)V_b$, where n is a number greater than zero. For instance, if n=0.1, when the current vibration level, $V_c$, 435, exceeded the background vibration level, $V_b$ 440, by 10%, then r=R.

In As long as r<R, the comparator function 430 returns a false, thus concluding compressor 100 is not in surge. When r≥R, the comparator function 430 returns a true, thus concluding the compressor 100 is in surge.

Figure 5:
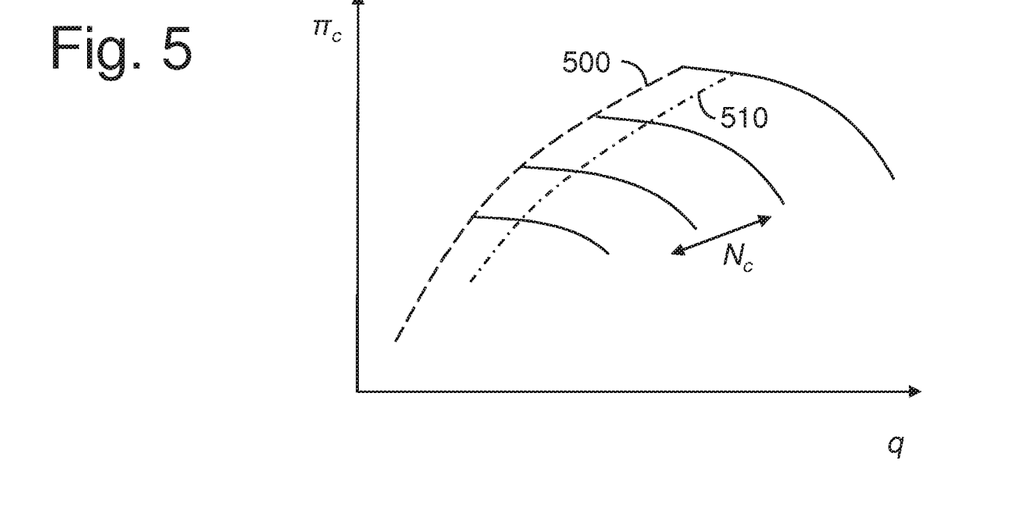
FIG. 5 is a representative compressor map showing a surge limit and a surge control curve.
Figure 6:
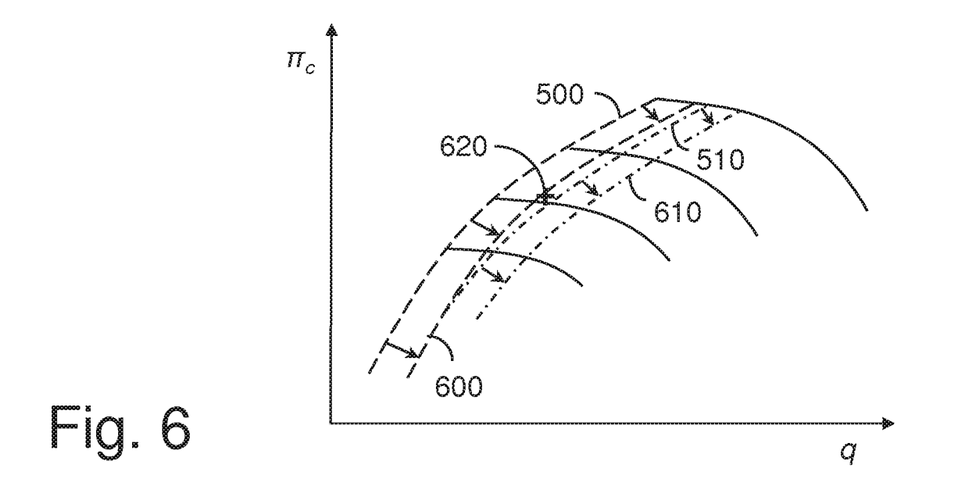
FIG. 6 is a representative compressor map showing an original and a new surge limit and an original and a new surge control curve.

The above conclusions may be used as illustrated in FIGS. 5 and 6. FIG. 5 illustrates a representative compressor performance map, commonly referred to as a compressor map. Those of ordinary skill in this art are familiar with compressor maps. The abscissa and ordinate variables are preferably dimensionless parameters or derived from dimensionless parameters obtained from similitude. The abscissa variable, is frequently related to the flow rate through the compressor 100. The ordinate variable, $\pi_c$, is frequently a static pressure ratio or related to a mass specific energy added to the compressed fluid. A more complete list of possible coordinate systems may be found in U.S. Pat. No. 5,508,943, which is hereby incorporated in its entirety by reference.

The individual curves having non-positive slopes in FIG. 5 are performance curves at different compressor rotational speeds. Each curve is for a different value of corrected speed, $N_c$, which is a function of the compressor rotational speed, N. The left-most curve 500 is the surge limit curve, surge limit line, or simply surge limit. To the left of and above the surge limit 500, the compressor's operation is unstable, and is characterized by periodic reversals of flow direction. This is surge as defined previously. The actual surge limit is sometimes unknown or only guessed at. In this case, the best guessed location of the curve is used in designing an antisurge control system for the compressor. The other curve having a positive slope in FIG. 5 is known as the surge control curve or surge control line. It is displaced toward the stable operating region from the surge limit by a safety margin. This curve is defined by an antisurge control system designer or field engineer based on experience or tests.

A typical antisurge control system will incorporate a digital depiction of the compressor map such that the control system can compare the location of the compressor's operating point to the surge control curve.

Consider a compressor operating point 620 as illustrated in FIG. 6. The surge limit 500 is assumed correct by the antisurge control designer, but may be inaccurate for a number of reasons, including compressor performance degradation over time. The surge control curve 510 is defined based on the assumed location of the surge limit 500. If the analysis illustrated in FIG. 4a concludes the compressor 100 is in surge when its operating point 620 is as shown in FIG. 6, the antisurge control system as schematically illustrated in FIG. 1 may use that information to automatically relocate its surge limit curve 600 and surge control curve 610 as shown.

Other uses of the conclusions drawn from the logic diagram of FIG. 4a include initiating an alarm, either visual or audible, to notify operators of a surge condition; and initiating the recording of operating parameters, such a record being archived for analysis to determine the cause of the surge event.

Figure 7A:
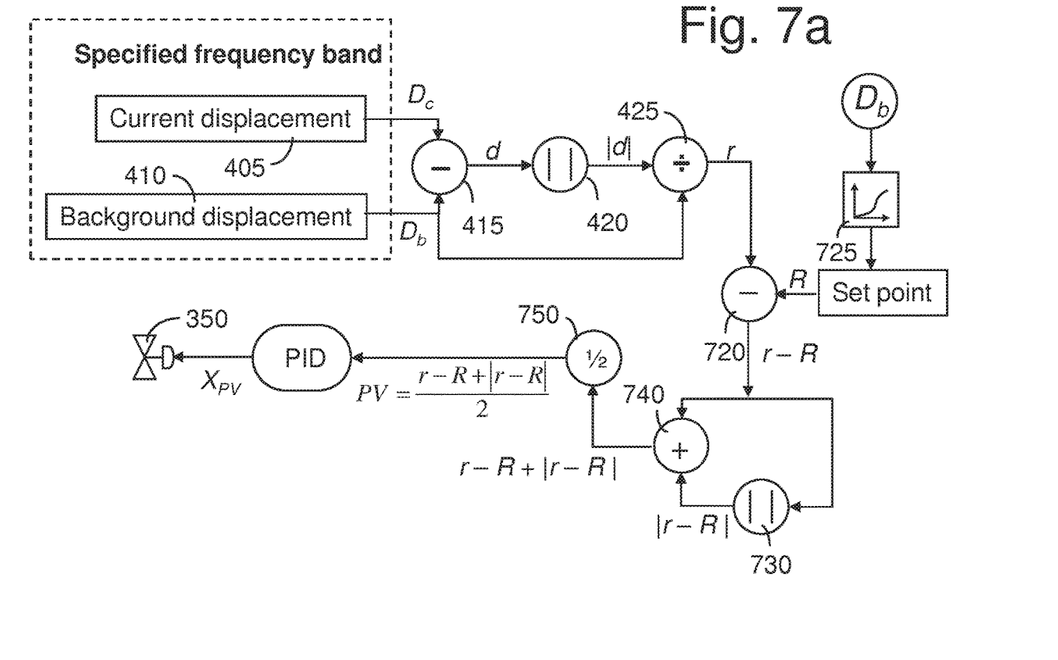
FIG. 7a is a logic diagram showing the calculation of a process variable for a PID loop from displacement data.

FIG. 7a illustrates another logic chart where the background displacement and current displacement are both quantified within the same predetermined frequency band, as indicated. The value of r is calculated in exactly the same fashion as detailed for FIG. 4a:

$$r = \frac{|D_c - D_b|}{D_b}.$$

The set point, R, is used in a difference operation 720, to calculate the value r−R. As above, R may be a function 725 of the background displacement, $D_b$, as illustrated. The value, r−R, is used in two separate branches of the logic path, in the lower branch, the absolute valve of r−R is determined in an absolute value operation 730. In the upper branch, the value r−R remains unchanged. In a summation operation 740, the sum of these two values, i.e., r−R|r−R| is found. This value must be nonnegative. This last sum is halved in a halving operation 750 before it is used as a process variable, PV, in a Proportional, Integral, Differential (PID) loop. The PID loop then calculates the set point for the recycle valve 350.

In the PID loop, the process variable, PV, signal may be processed to, for instance, reduce noise. Then an output of the PID loop is calculated as:

$$X_{sp} = P \cdot PV + I \int_{t}^{t+t_l} (PV) d\tau + D \frac{d(PV)}{dt}$$

which is used as the set point for the antisurge valve. In this equation, P is the coefficient for the proportional term, I is the coefficient for the integral term, D is the coefficient for the derivative term, and $t_l$ is the loop time of the control loop. Those of ordinary skill in the art are well familiar with PID loops.

Figure 7B:
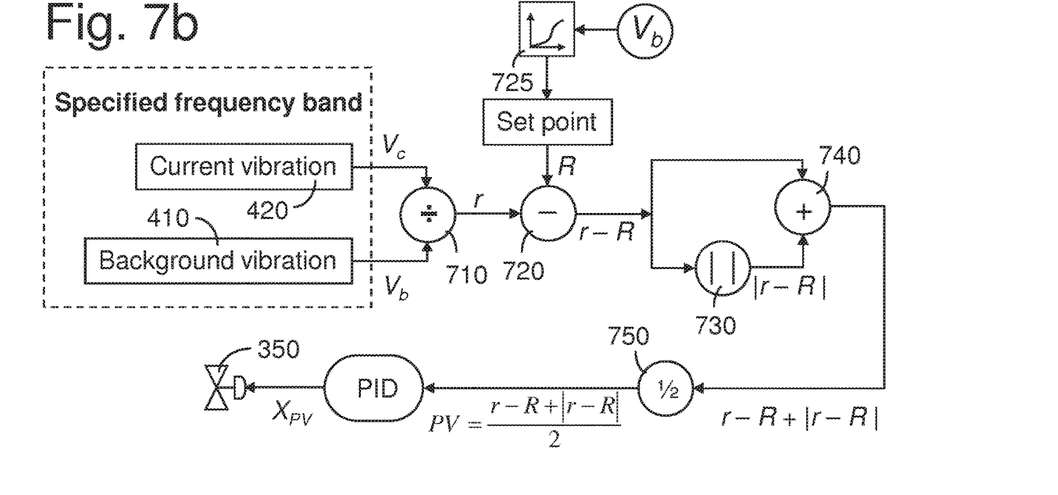
FIG. 7b is a logic diagram showing the calculation of a process variable for a PID loop from vibration data.

FIG. 7b illustrates still another logic chart where the background vibration and current vibration are both quantified within the same predetermined frequency band, as indicated. Here, vibration connotes velocity or acceleration. The ratio of the current vibration level, $V_c$, to the background vibration level, $V_b$, is determined in a division operation 710, $$r = \frac{V_c}{V_b}.$$

The set point, R, is used in a difference operation 720, to calculate the value r−R. As above, R may be a function 725 of the background vibration, $V_b$, as illustrated. The value, r−R, is used in two separate branches of the logic path. In the lower branch, the absolute value of r−R is determined in an absolute value operation 730. In the upper branch, the value r−R remains unchanged. In a summation operation 740, the sum of these two values, i.e., r−R+|r−R| is found. This value must be nonnegative. This last sum is halved in a halving operation 750 before it is used as a process variable, PV, in a Proportional, Integral, Differential (PID) loop. The PID loop then calculates the set point for the recycle valve 350.

In the PID loop., the process variable, PV, signal may be processed to, for instance, reduce noise. Then an output is calculated as above, and is used as the set point for the antisurge valve.

Figure 8:
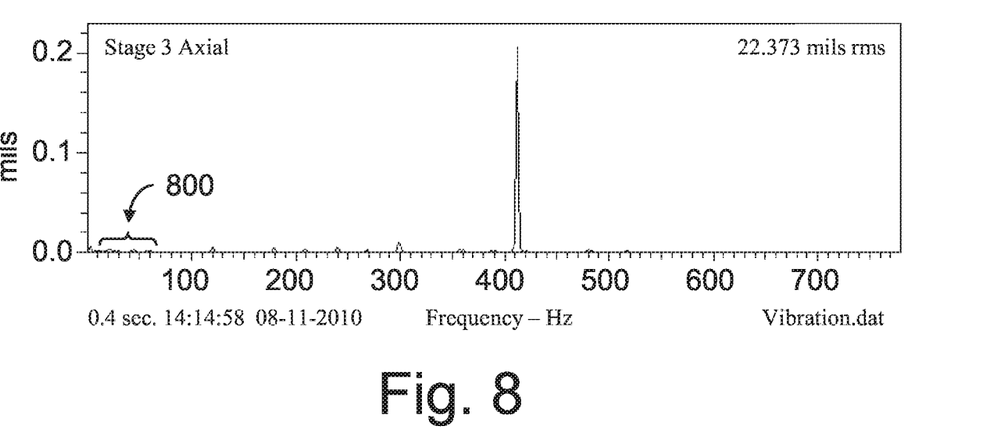
FIG. 8 is a frequency plot of compressor rotor shaft axial displacement.

A plot of a Fourier transform of the axial vibration data taken from a compressor is shown in FIG. 8. The spike at about 412 Hz represents the rotational speed of the compressor. When surge occurs, the axial vibration level in a range 800 of low frequencies, i.e. 10-70 Hz increases dramatically. Hence, a band of frequencies in this range 800 proves most useful for monitoring for surge in a preferred embodiment of this invention.

Figure 9:
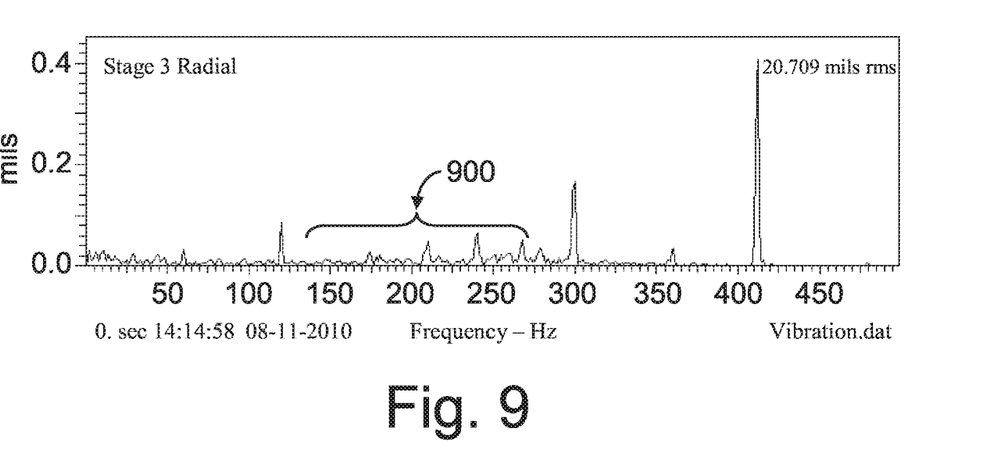
FIG. 9 is a frequency plot of compressor rotor shaft radial displacement.

The Fourier transform of radial vibration of a compressor is plotted in FIG. 9. Compressor surge will result in increased vibration in a frequency band 900 of 40-60% of the compressor's rotational speed. A band of radial frequencies in this frequency range 900 is used for monitoring for surge in a preferred embodiment of this invention. The exact band is preferably determined individually for each compressor by test.

Figure 10:
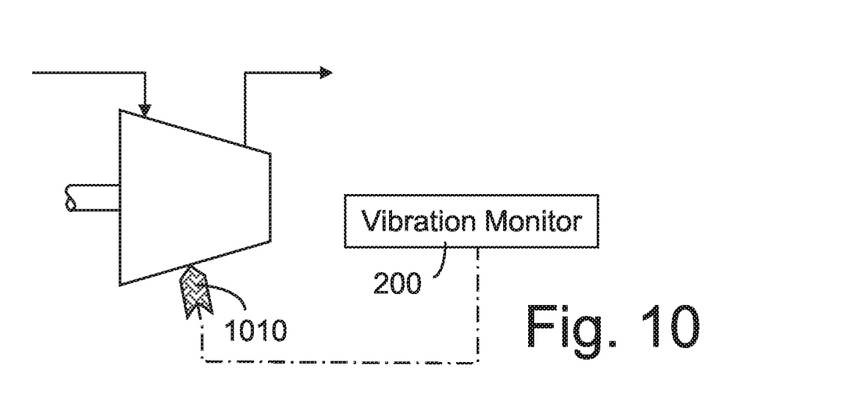
FIG. 10 illustrates a vibration sensor affixed externally to the compressor.

Another preferred embodiment of the present invention is shown in FIG. 10. This embodiment is particularly suited to retrofits. Where a compressor 100 was not originally outfitted with a vibration monitoring system. A sensor 1010, which may sense position, velocity, or acceleration, is installed on an external component of the compressor 100, such as the housing, volute, piping, etc. where it will provide accurate measurements of the vibrations caused by compressor surge. The same calculation methods and application of the results as explained and illustrated herein are used with the data gathered from such an externally mounted sensor. The location of the externally mounted sensor should be chosen to minimize background noise.

The above embodiments are the preferred embodiment, but this invention is not limited thereto, nor to the figures and examples given above. It is, therefore, apparent that many modifications and variations of the present invention are possible in light of the above teachings. It is, therefore, to be understood that within the scope of the appended claims, the invention may be practiced otherwise than as specifically described.

The invention claimed is:

1. A method of antisurge control for a turbocompressor, the method comprising:
   receiving, by an antisurge controller and from at least one sensor, displacement data associated with a rotor shaft of the turbocompressor, wherein the displacement data is received over a period of time in which the turbocompressor is not in a surge condition;
   calculating, by the antisurge controller, a background displacement level based on the displacement data;
   receiving, by the antisurge controller, a current displacement level from the at least one sensor;

calculating, by the antisurge controller, a value based on the background displacement level and the current displacement level;

comparing, by the antisurge controller, the value to a set point; and controlling an antisurge valve based on a comparison of the value to the set point.

2. The method of claim 1, wherein the calculating a value comprises calculating a difference between the current displacement level and the background displacement level.

3. The method of claim 2, wherein controlling the antisurge valve comprises:

determining if the difference between the current displacement level and the background displacement level exceeds the background displacement level by more than a predetermined amount or percentage; and opening the antisurge valve in response to determining that the difference exceeds the background displacement level by more than the predetermined amount or percentage.

4. The method of claim 1, wherein controlling the antisurge valve comprises opening the antisurge valve based on the comparison.

5. The method of claim 1, further comprising:

selecting a frequency band based on a rotational speed of the turbocompressor.

6. The method of claim 5, wherein the receiving displacement data and receiving a current displacement level comprises:

receiving displacement information associated with the selected frequency band.

7. The method of claim 1, wherein the displacement data comprises at least one of radial shaft displacement or axial shaft displacement associated with the rotor shaft.

8. An apparatus for providing antisurge control for a turbocompressor, the apparatus comprising:

at least one sensor comprising at least one of a displacement sensor, a velocity sensor or an acceleration sensor configured to measure data associated with a rotor shaft of the turbocompressor; and a controller configured to:
receive data from the at least one sensor over a period of time in which the turbocompressor is not in a surge condition,
calculate a background level based on the data,
receive a current level from the at least one sensor,
calculate a value based on the background level and the current level,
compare the value to a set point, and
control an antisurge valve based on a comparison of the value to the set point.

9. The apparatus of claim 8 wherein the at least one sensor is configured to monitor axial displacement or vibration of the rotor shaft.

10. The apparatus of claim 8, wherein the at least one sensor is configured to monitor radial displacement or vibration of the rotor shaft.

11. The apparatus of claim 8, wherein the at least one sensor is configured to measure at least one of velocity or acceleration of the rotor shaft.

12. The apparatus of claim 8, further comprising:
the turbocompressor.

13. The apparatus of claim 8, wherein receiving data and receiving a current level comprises:

receiving the data and the current level for a selected frequency band.

14. A method of antisurge control for a turbocompressor, the method comprising:

receiving, by an antisurge controller and from at least one sensor, vibration data associated with a rotor shaft of the turbocompressor, wherein the vibration data is received over a period of time in which the turbocompressor is not in a surge condition;

calculating, by the antisurge controller, a background vibration level based on the vibration data;

receiving, by the antisurge controller, a current vibration level from the at least one sensor;

calculating, by the antisurge controller, a value based on the background vibration level and the current vibration level;

comparing, by the antisurge controller, the value to a set point; and controlling an antisurge valve based on a comparison of the value to the set point.

15. The method of claim 14, wherein the vibration data comprises one of displacement, vibration or acceleration data associated with operation of the rotor shaft.

16. The method of claim 14, wherein controlling the antisurge valve comprises:

determining if a difference between the current vibration level and the background vibration level exceeds the background vibration level by more than a predetermined amount or percentage; and opening the antisurge valve in response to determining that the difference exceeds the background vibration level by more than the predetermined amount or percentage.

17. The method of claim 14, further comprising:
selecting a frequency band based on a rotational speed of the turbocompressor.

18. The method of claim 17, wherein the receiving vibration data and receiving a current vibration level comprises:

receiving vibration information associated with the selected frequency band.

19. The method of claim 14, wherein the vibration data comprises at least one of radial shaft displacement data or axial shaft displacement data associated with the rotor shaft.

20. The method of claim 14, further comprising:
generating an operating point for the antisurge valve based on the background vibration level.

* * * * *